(No Model.) 2 Sheets—Sheet 2.
F. W. WRIGHT.
HOSE COUPLING.
No. 471,662. Patented Mar. 29, 1892.
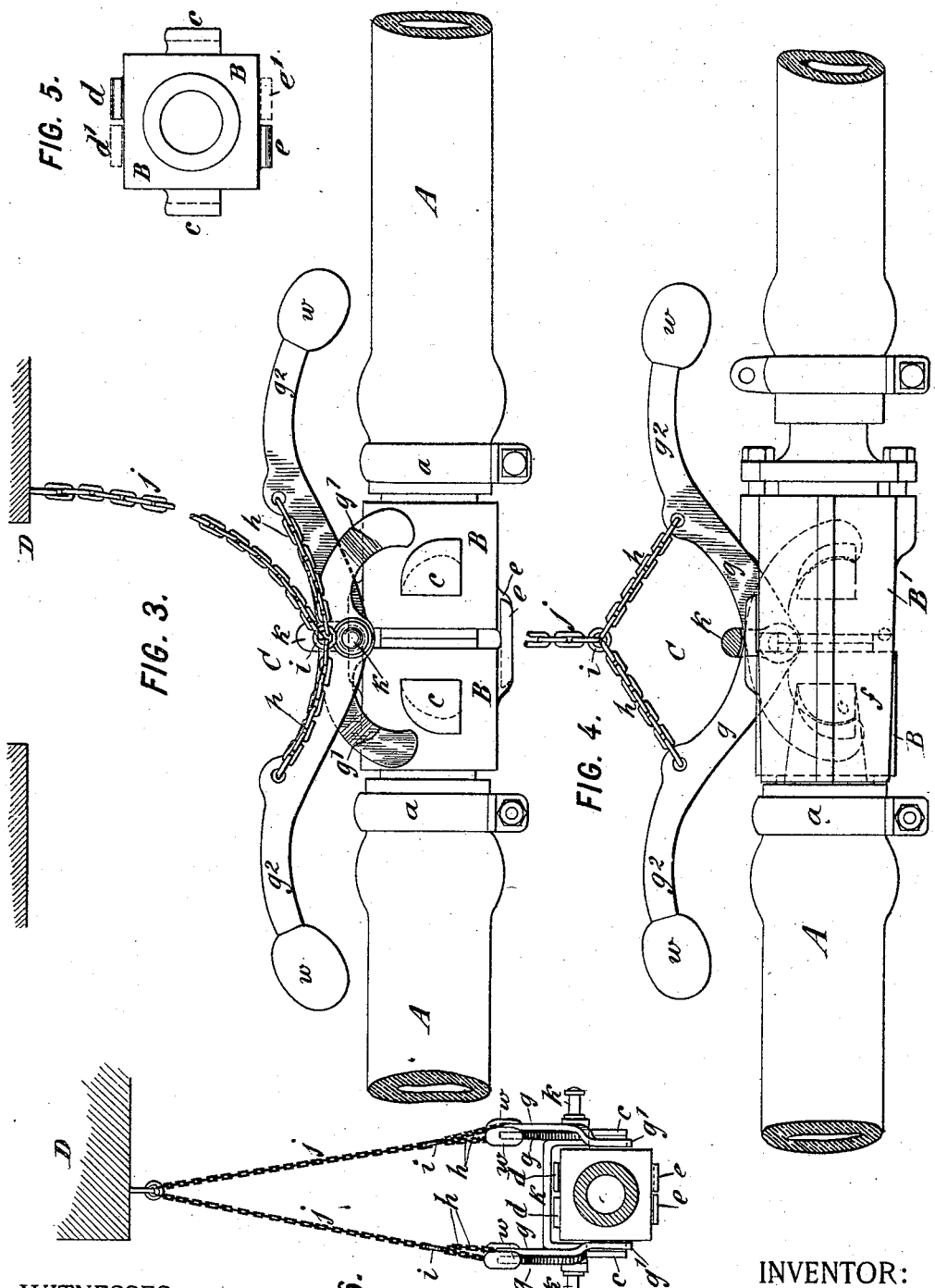
WITNESSES:
John Becker
C. K. Fraser.
INVENTOR:
Frederic W. Wright,
By his Attorneys,
Arthur C. Fraser & Co.

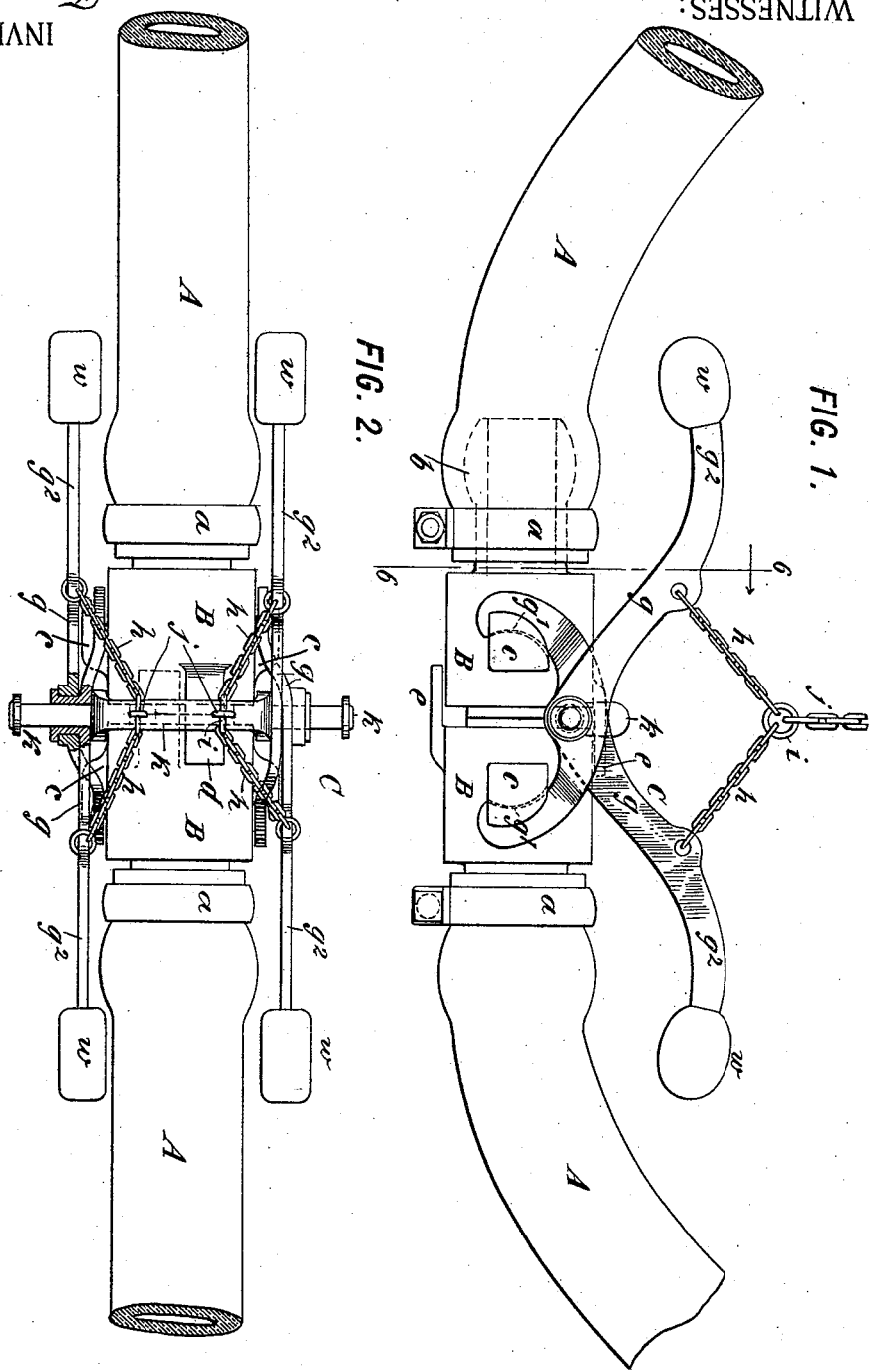

UNITED STATES PATENT OFFICE.

FREDERIC W. WRIGHT, OF GREAT NECK, NEW YORK.

HOSE-COUPLING.

SPECIFICATION forming part of Letters Patent No. 471,662, dated March 29, 1892.

Application filed July 9, 1891. Serial No. 398,880. (No model.)

*To all whom it may concern:*

Be it known that I, FREDERIC W. WRIGHT, a citizen of the United States, residing at Great Neck, in the county of Queens and State of New York, have invented certain new and useful Improvements in Hose-Couplings, (Case F,) of which the following is a specification.

This invention relates to hose-couplings, being especially designed for couplings employed for connecting the steam-heating pipes of railway-cars, but useful also for other purposes.

It relates to that class of couplings known as "direct-port" couplings or those in which the abutting valve-seats meet in a plane approximately perpendicular to the general direction of the hose or pipe.

According to my invention I provide the ends of the lengths of hose that are to be coupled with heads fastened to them in any suitable way and having locking projections which, instead of interengaging with each other, as heretofore, are engaged by a separate piece or locking device independent of the heads by which the two heads are locked and held together. This locking device may be made in various ways, but is preferably made of locking-jaws pivoted together after the manner of tongs and hung by chains from the platform of one of the car-bodies or other suitable support.

Figure 1 of the accompanying drawings is a side elevation of my improved coupling, showing it coupled. Fig. 2 is a plan thereof. Fig. 3 is a side elevation showing the coupler in the act of uncoupling automatically. Fig. 4 is a side elevation showing one of the heads of my improved coupler coupled with a Sewall coupler. Fig. 5 is an end view of one of the heads of my coupler. Fig. 6 is a vertical transverse section on the line 6 6 in Fig. 1 and showing the means for suspending the locking device.

Let A A designate the respective lengths of hose or flexible pipe to be coupled together, B B the respective coupling-heads fastened to the ends thereof, and C the locking device as a whole.

The heads B are shown as provided each with a neck $b$, (shown in dotted lines in Fig. 1,) over which the end of the hose is drawn and fastened by a clamping-collar $a$; but any other means of attachment may be employed instead. The head B is shown as being square in cross-section (see Fig. 5) and having on its opposite sides two locking projections $c\,c$, both alike and preferably of the shape shown. To insure the proper fitting together of the two heads in order to bring their seats into alignment, they are formed with guiding arms or spurs $d$ and $e$, respectively, the spur $d$ projecting from the top of one side of the middle and the spur $e$ from the bottom of the other side. These arms are long enough to overhang the opposite coupling-head, so that the arms on each head engage the other, and thereby prevent displacement of the heads relatively to one another in either up and down or lateral direction. The two arms $d\,e$ on each head are shown in full lines in Fig. 5, and the position occupied by the two arms on the other head is shown by that figure in dotted lines at $d'$ and $e'$.

In order that my improved coupler may intercouple with the so-called "Sewall" coupler now so largely in use, I make the projection $c$ of the same shape and position relatively to the seating-faces as in the Sewall coupler, so that when a Sewall coupler, as shown at B' in Fig. 4, is intercoupled with one of the heads of my improved coupler its locking-arm (lettered $f$ in Fig. 4) may engage the projection $c$ on one side.

The intermediate locking device C, by which the two coupling-heads B B are held together, may be of any construction having suitable provisions for engaging the locking projections $c\,c$ on the respective heads and adapted by such engagement to hold the heads in contact, with their seats pressed together with the requisite tightness. The construction shown consists of two lever-arms $g\,g$ for each side of the coupling-heads, pivoted together somewhat after the manner of tongs, formed with their short arms curved inwardly to form engaging faces $g'\,g'$ for grasping the outer sides of the locking projections $c\,c$ on the respective heads, and with their longer arms connected by chains or links $h\,h$ to a ring $i$, which is suspended by a chain $j$ from an overhead support D, (shown in Fig. 6,) which may be the platform of a railway-car. The lever-arms are continued at $g^2$ beyond the engagement of the chains $h$ and carry at their ends counter-weights $w$. When in the coupled position, the levers $g\,g$ engage the projections c c, as shown in Fig. 1, and the chains h h, from which they are hung, act to draw their long arms toward each other, and thereby tend to press the projections c c toward one another, thus forcing the seats into intimate contact.

The entire weight of the coupling-heads and a large part of the weight of the sections A A of hose is borne by the locking device C and is suspended from the chains h j, so that this weight is effective to exert a thrust tending to close the coupling-levers g g upon the projections and draw the heads together. The chains h h are of such length that the pull exerted through them acts as an increased leverage to draw the levers g together. The action is the reverse of the thrust transmitted through "toggle-levers" or "knees," so called, and by analogy the chains h h may be called "toggle-chains." The leverage should be so proportioned that the pressure exerted at the seating-faces is sufficient to hold them pressed tightly together and resist whatever pressure of steam or compressed air or other fluid the coupling is designed for.

The levers g g are duplicated for opposite sides of the coupling-heads, and the two pairs of levers are preferably pivoted both on the same bar or stem k, as shown best in Figs. 2 and 6. In order that the pivots of the levers may be brought sufficiently low, the pivotal bar k may be bent downwardly at its ends.

My improved coupling may be adapted for automatic uncoupling by suitably proportioning the parts. Fig. 3 shows, approximately, the action of automatic uncoupling, the hose-lengths A A being drawn taut by the pulling apart of the cars, thereby lifting the coupling-heads and taking their weight off from the chains h j. By so doing these chains are slackened and the counter-weights w w become effective to impart to the long arms of the levers g g a tendency to fall, whereby the levers are caused to collapse and disengage themselves from the projections c c in the manner shown in Fig. 3. The chains h h are made of a combined length sufficient to admit of this movement of the levers.

When my improved coupling is coupled with a Sewall coupler, the locking engagement is effected on one side by means of the locking-arm f of the Sewall coupler, and on the other side one of the pairs of tongs or levers g g is coupled, as shown in Fig. 4. When thus coupled, the other pair of tongs is for the time being out of use. The pivotal bar k is made long enough so that this additional pair of tongs may be slid to one side sufficiently far to clear the locking-arm f. This additional pair is not shown in Fig. 4, the locking-section being shown with its bar k in section cut between the two pairs of locking levers or tongs.

I am aware that an intermediate coupling-head has been employed having seating-faces and adapted for coupling together two coupling-heads of different construction by being itself interposed between them and engaged with each of them. I am also aware that coupling-heads have had hooks pivoted to them and designed to be swung over by hand to engage locking projections on the reciprocal head; but I am not aware that coupling-heads have been united together with their respective seating-faces in engagement by a separate locking device engaging locking projections on them independent of either head and employed solely for the purpose of forming an intermedium of engagement between the locking faces or projections on one side and those on the other.

I claim as my invention the following-defined novel features or combinations, substantially as hereinbefore specified, namely:

1. The combination of two coupling-heads having seats meeting face to face and formed with locking projections, and an intermediate locking device independent of both engaging the locking projections on said heads and adapted to force them together and hold the seating-faces of the heads in engagement.

2. The combination of two coupling-heads having seats meeting face to face and formed with locking projections, and an intermediate locking device independent of both heads, consisting of lever arms or tongs pivoted together engaging the locking projections on the respective heads and adapted to draw them together.

3. The combination of two coupling-heads having seats meeting face to face and formed with locking projections, and an intermediate locking device consisting of lever arms or tongs engaging the locking projections on the respective heads and adapted to draw them together, and toggle-chains engaging said lever-arms and adapted by reason of the weight of the coupling to exert a pull upon said levers tending to close their locking-arms together and press the seating-faces of the heads together.

4. The combination of two coupling-heads B B, each having locking projections c c on opposite sides, with a coupling device C, consisting of two pairs of levers or tongs g g, forming locking-arms engaging projections on opposite sides of the heads, and suspending-chains adapted to draw said arms together.

5. The combination, with coupling-heads B B, each having opposite projections c c, of a coupling device C, consisting of two pairs of levers or tongs g g, engaging said projections on opposite sides of the heads, a bar k on which said levers are pivoted, and suspending-chains h j, substantially as specified.

In witness whereof I have hereunto signed my name in the presence of two subscribing witnesses.

FREDERIC W. WRIGHT.

Witnesses:
GEORGE H. FRASER,
CHARLES K. FRASER.